US008756277B2

(12) United States Patent
 Tyree

(10) Patent No.: US 8,756,277 B2
(45) Date of Patent: Jun. 17, 2014

(54) AUTOMATICALLY GENERATING COMPLIANCE QUESTIONNAIRES

(75) Inventor: David S. Tyree, Centreville, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 320 days.

(21) Appl. No.: 12/632,025

(22) Filed: Dec. 7, 2009

(65) Prior Publication Data

US 2011/0137987 A1 Jun. 9, 2011

(51) Int. Cl.
 *G06F 15/16* (2006.01)
(52) U.S. Cl.
 USPC .......................................... 709/204; 709/205
(58) Field of Classification Search
 None
 See application file for complete search history.

(56) References Cited

U.S. PATENT DOCUMENTS

| 2002/0035486 A1* | 3/2002 | Huyn et al. ...................... 705/3 |
| 2006/0101520 A1* | 5/2006 | Schumaker et al. ............. 726/25 |
| 2008/0033886 A1* | 2/2008 | Witz ........................... 705/36 R |
| 2008/0154894 A1* | 6/2008 | Chen et al. ....................... 707/6 |

* cited by examiner

*Primary Examiner* — Krista Zele
*Assistant Examiner* — Keyvan Emdadi

(57) ABSTRACT

A device receives compliance content from a user device, determines requirements associated with the compliance content, and matches the requirements with compliance questions provided in a compliance library associated with the device. The device also automatically generates a compliance questionnaire based on the compliance questions matching the requirements, and provides the compliance questionnaire to the user device. The compliance questionnaire includes a minimum set of compliance questions needed to determine compliance.

20 Claims, 9 Drawing Sheets

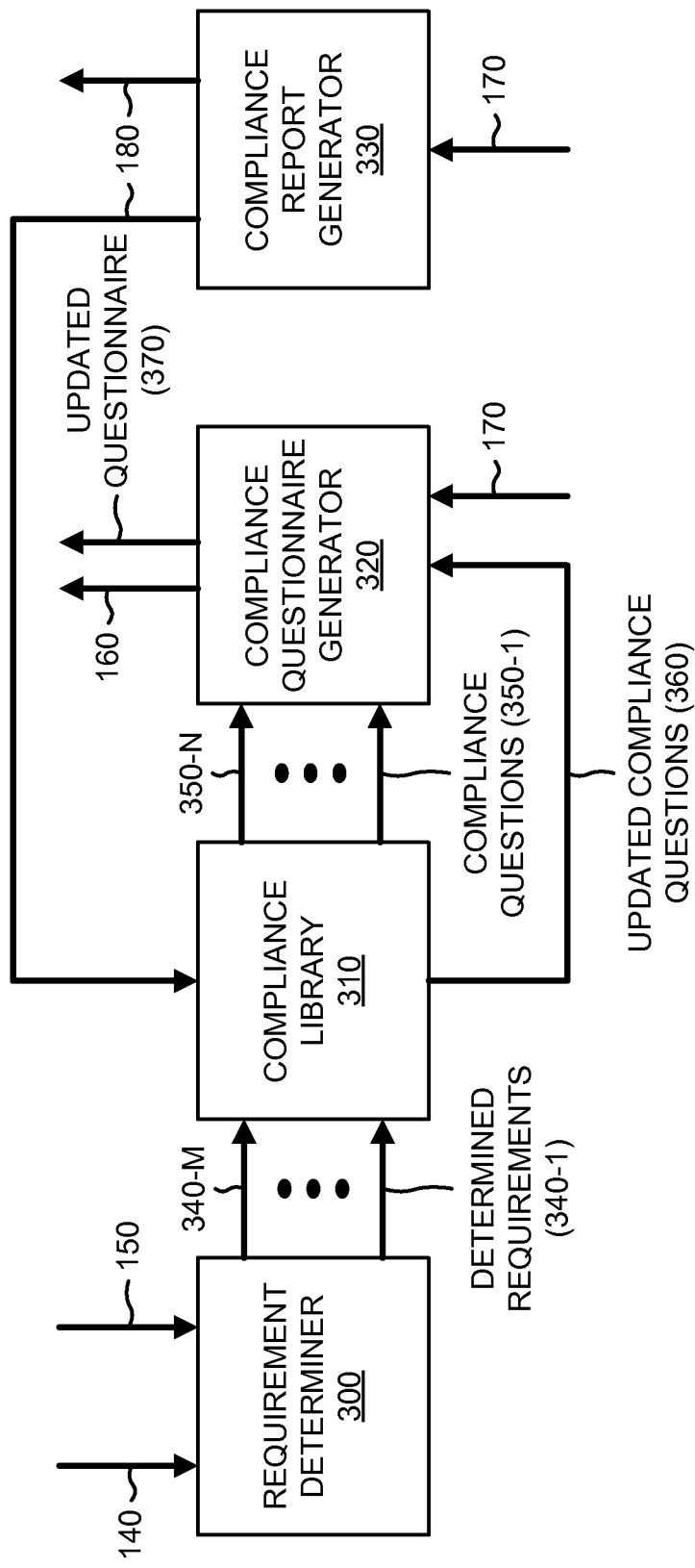

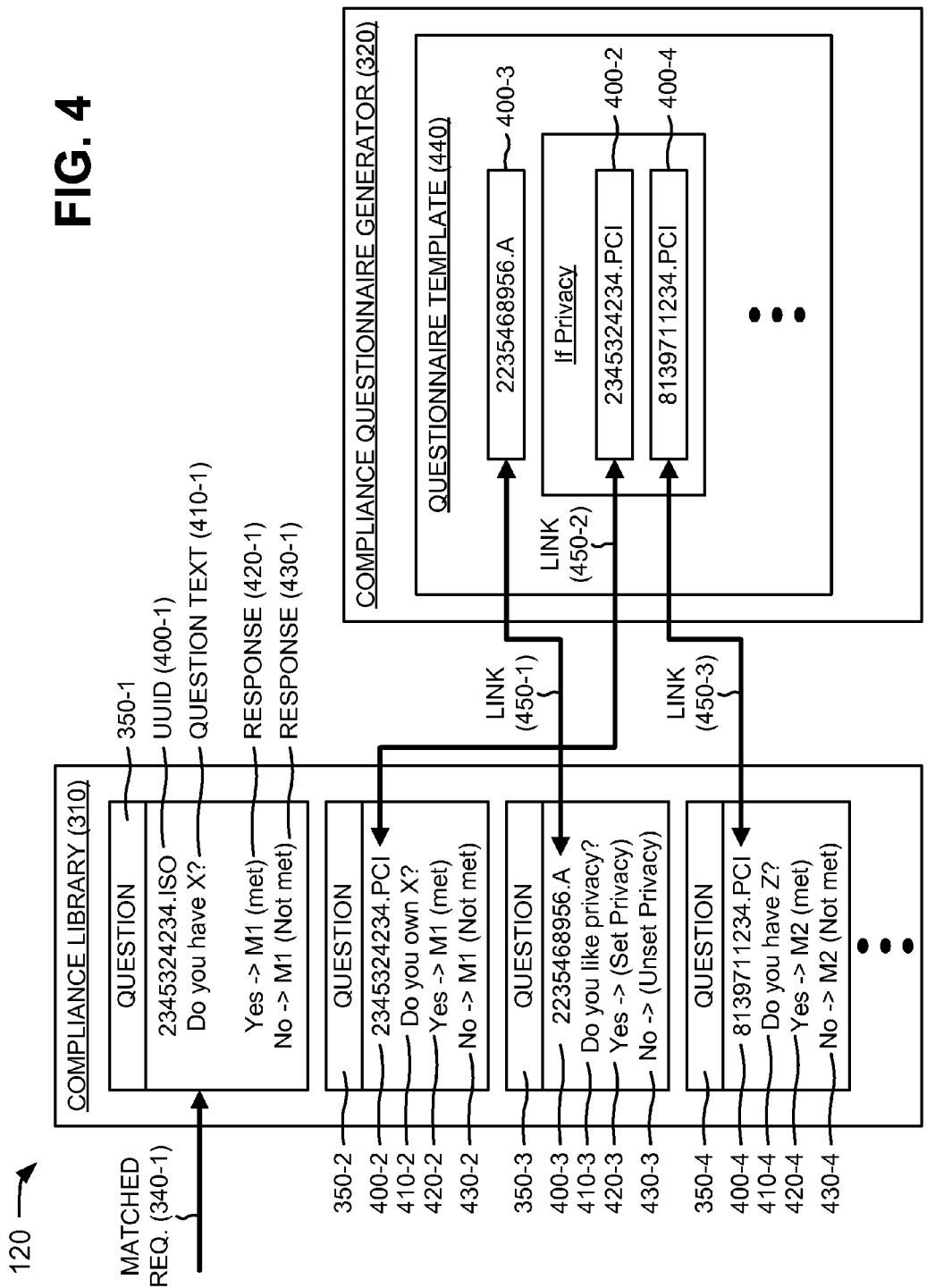

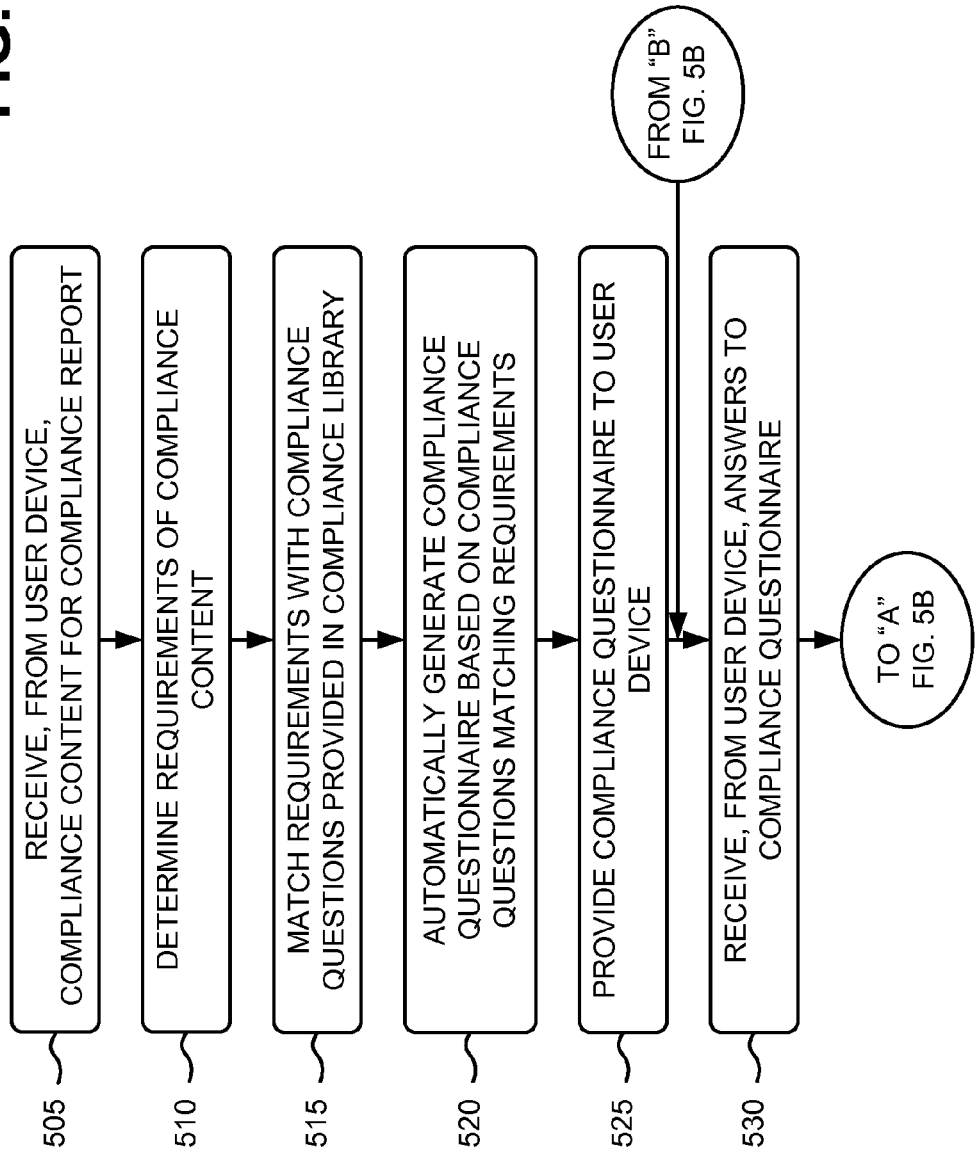

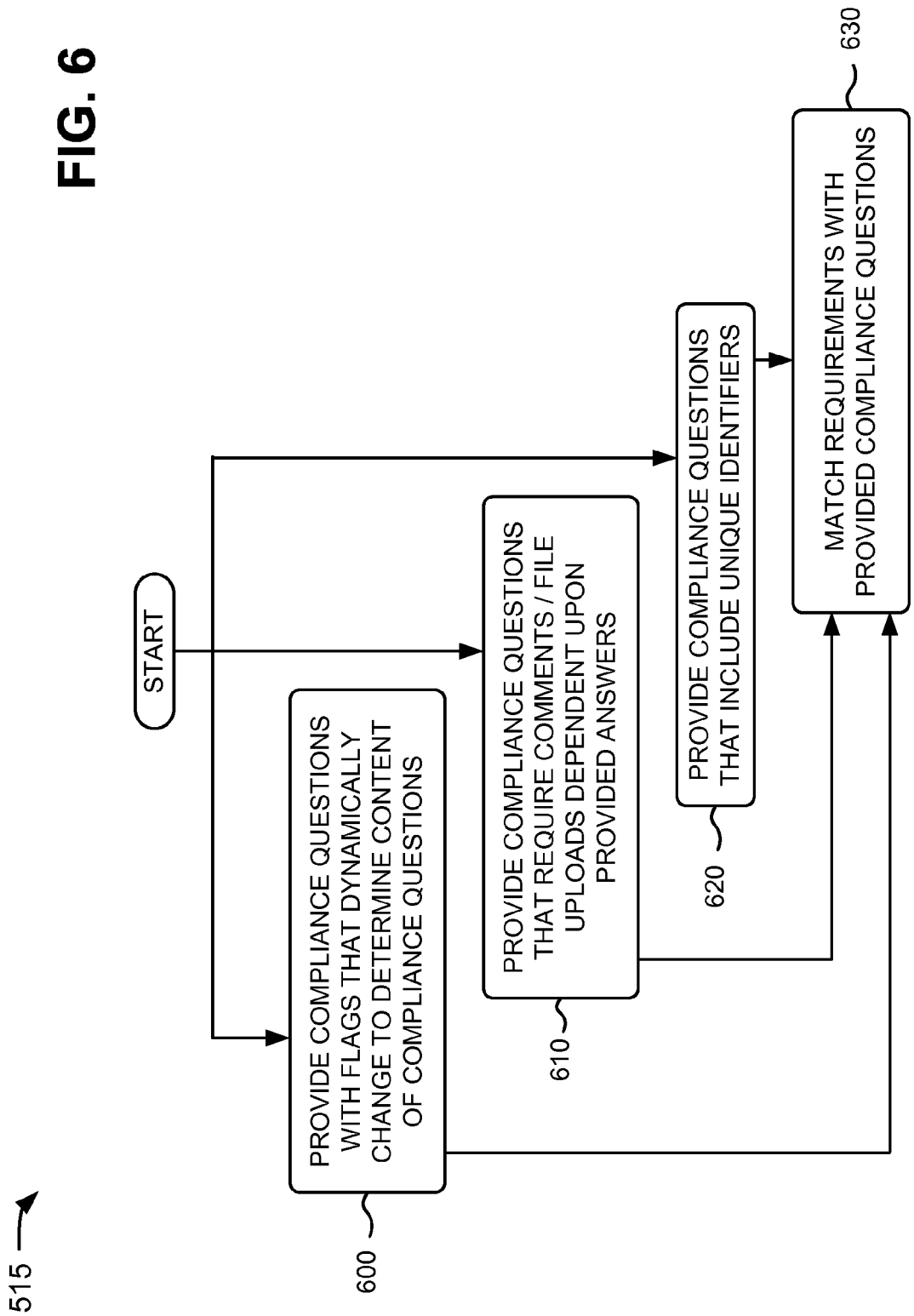

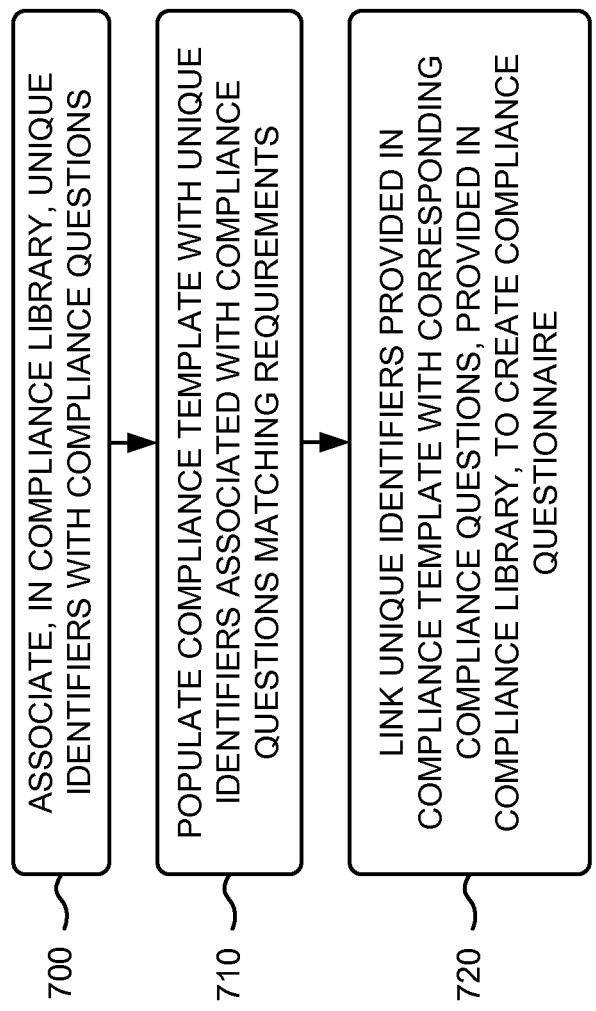

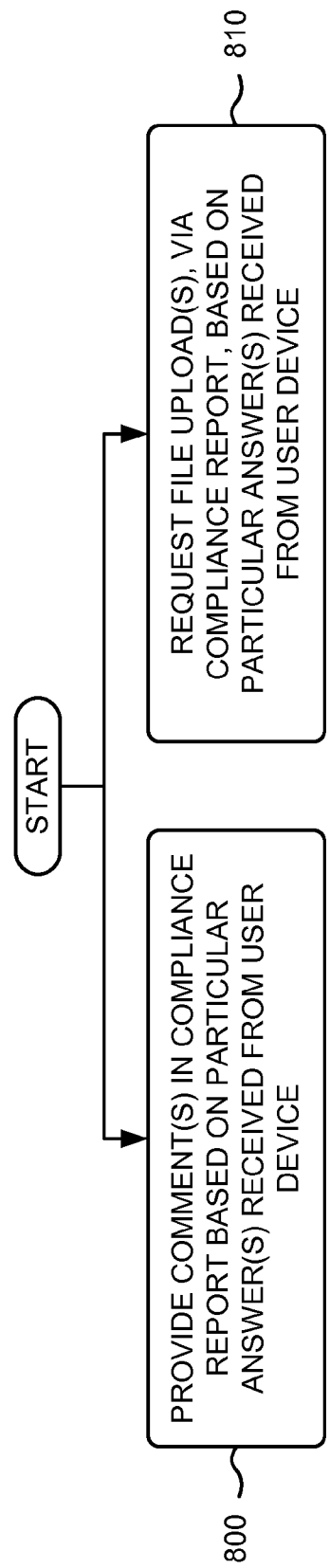

AUTOMATICALLY GENERATING COMPLIANCE QUESTIONNAIRES

BACKGROUND

Compliance means conforming to specifications, policies, standards, regulations, rules, laws, etc., as required or requested (e.g., compliance with federal laws, device compliance with industry standards, compliance with company policies, etc.). Regulatory compliance describes goals that corporations or public agencies aspire to in their efforts to ensure that personnel are aware of and take steps to comply with relevant laws, standards, and regulations. Examples of such rules, standards, etc. include International Organization for Standardization (ISO) standards, Gramm-Leach-Bliley Act (GLBA) standards, Federal Information Security Management Act (FISMA) standards, Health Insurance Portability and Accountability Act (HIPAA) standards, the control objectives for information and related technology (COBIT) framework, National Institute of Standards and Technology (NIST) standards, etc.

Compliance data is defined as all data belonging or pertaining to an entity or included in the law, which can be used for the purpose of implementing or validating compliance. One way organizations (e.g., corporations, public agencies, etc.) attempt to measure compliance is to collect compliance data via compliance questionnaires. An organization may disseminate the compliance questionnaires to its employees, and may determine the organization's compliance based on answers provided to the compliance questionnaires.

BRIEF DESCRIPTION OF THE DRAWINGS

FIGS. 3 and 4 are diagrams of exemplary functional components of the compliance server depicted in FIG. 1; and FIGS. 5A-8 are flow charts of an exemplary process for automatically generating compliance questionnaires according to implementations described herein.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein may provide systems and/or methods that may automatically generate compliance questionnaires based on compliance content received from a user device and/or other sources. In an exemplary implementation, the systems and/or methods may receive, from a user device, compliance content, may determine requirements from the compliance content, and may match the determined requirements with compliance questions. The systems and/or methods may automatically generate a compliance questionnaire based on the compliance questions that match the requirements, and may provide the compliance questionnaire to the user device. The systems and/or methods may receive answers to the compliance questionnaire from the user device, and may determine whether the compliance questionnaire needs to be updated based on the answers. If the compliance questionnaire needs to be updated, the systems and/or methods may generate an updated compliance questionnaire based on the answers, and may provide the updated compliance questionnaire to the user device. If the compliance questionnaire does not need to be updated, the systems and/or methods may generate a compliance report based on the answers, and may provide the compliance report to the user device.

As used herein, the term "user" is intended to be broadly interpreted to include a user device or a user (e.g., a person answering a compliance questionnaire) of a user device.

"Compliance," as the term is used herein, is intended to be broadly interpreted to include conforming to specifications, policies, standards, regulations, rules, laws, etc., as required or requested (e.g., compliance with federal laws, device compliance with industry standards, compliance with company policies, etc.).

A "compliance questionnaire," as the term is used herein, is intended to be broadly interpreted to include a set of questions (e.g., provided in a document) for obtaining information associated with compliance.

"Content," as the term is used herein, is to be broadly interpreted to include any machine-readable and machine-storable work product, document, electronic media, print media, etc. Content may include, for example, information contained in documents, print media (e.g., newspapers, magazines, books, encyclopedias, etc.), electronic newspapers, electronic books, electronic magazines, online encyclopedias, electronic media (e.g., image files, audio files, video files, web casts, podcasts, etc.), the Internet, etc.

Figure 1:
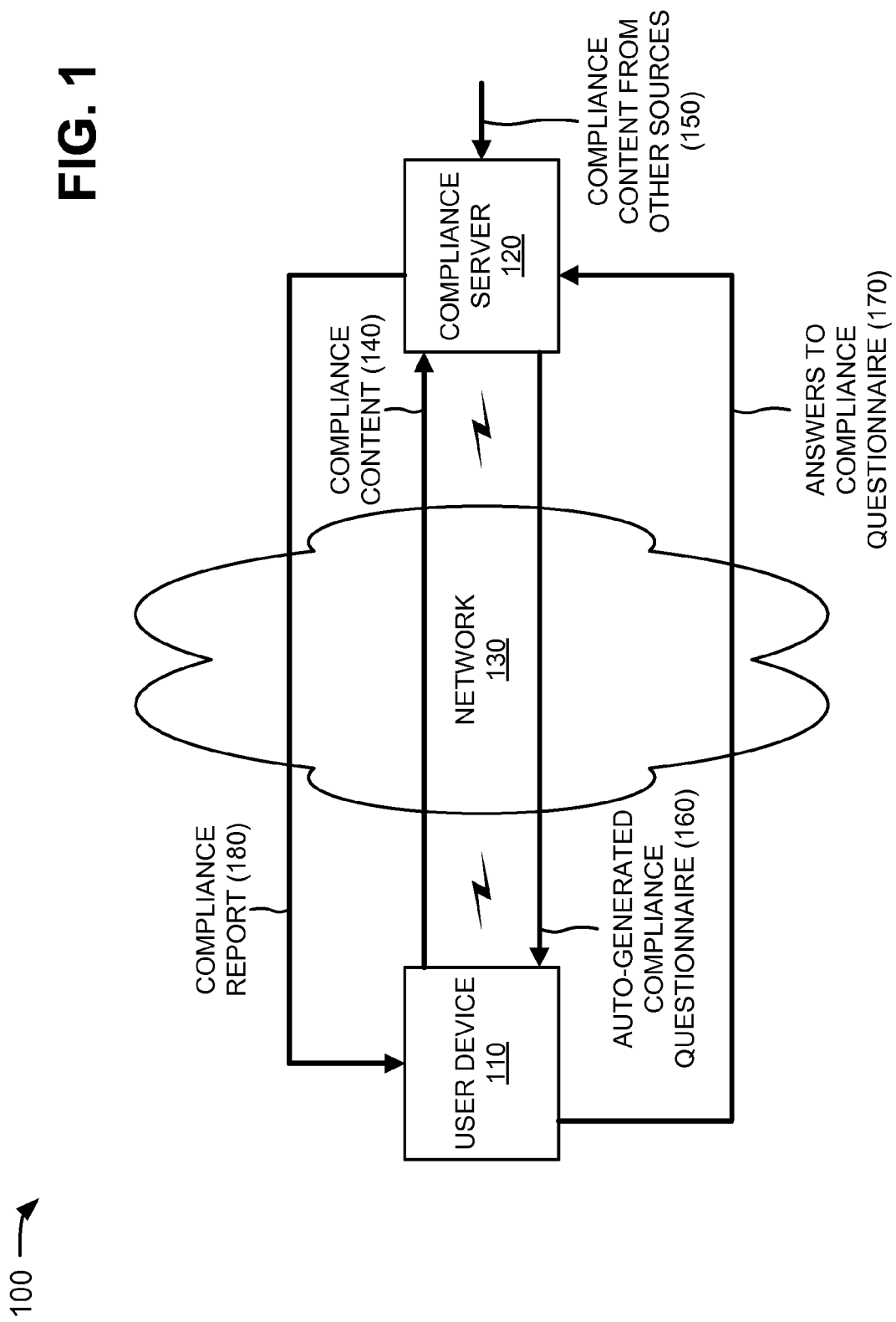
FIG. 1 is a diagram of an exemplary network in which systems and/or methods described herein may be implemented.

FIG. 1 is a diagram of an exemplary network 100 in which systems and/or methods described herein may be implemented. As illustrated, network 100 may include a user device 110 and a compliance server 120 interconnected by a network 130. Components of network 100 may interconnect via wired and/or wireless connections. A single user device 110, compliance server 120, and network 130 have been illustrated in FIG. 1 for simplicity. In practice, there may be more user devices 110, compliance servers 120, and/or networks 130. Also, in some instances, one or more of the components of network 100 may perform one or more functions described as being performed by another one or more of the components of network 100. In one example, network 100 may correspond to a network owned and/or managed by an organization.

User device 110 may include any device that is capable of accessing compliance server 120 via network 130. For example, user device 110 may include a radiotelephone; a personal communications system (PCS) terminal (e.g., that may combine a cellular radiotelephone with data processing and data communications capabilities); a personal digital assistant (PDA) (e.g., that can include a radiotelephone, a pager, Internet/intranet access, etc.); a laptop computer; a personal computer; or other types of computation or communication devices. In one exemplary implementation, user device 110 may access compliance server 120 in order to obtain a compliance questionnaire and/or a compliance report.

Compliance server 120 may include one or more server devices, or other types of computation or communication devices, that gather, process, search, and/or provide information in a manner described herein. In one exemplary implementation, compliance server 120 may automatically generate a compliance questionnaire, may provide the compliance questionnaire to user device 110, and may provide a compliance report to user device 110. Further details of compliance server 120 are provided below in connection with, for example, FIGS. 2-4.

Network 130 may include one or more networks of any type. For example, network 130 may include a local area network (LAN), a wide area network (WAN), a metropolitan area network (MAN), a telephone network, such as the Public Switched Telephone Network (PSTN) or Public Land Mobile Network (PLMN), an intranet, the Internet, an optical fiber (or fiber optic)-based network, or a combination of networks.

As further shown in FIG. 1, user device 110 may provide compliance content 140 to compliance server 120, and/or compliance server 120 may receive compliance content 150 from other sources (e.g., other user devices, the Internet, standards organizations, etc.). Compliance content 140/150 may include content associated with specifications, policies, standards, regulations, rules, laws, etc. to be complied with (e.g., by an organization associated with network 100). In one example, compliance content 140/150 may include a request for a compliance questionnaire associated with a particular compliance content (e.g., specification, policy, standard, regulation, rule, law, etc.). Compliance server 120 may determine requirements from compliance content 140 and/or 150. Alternatively, or additionally, compliance server 120 may receive (e.g., from a customer associated with user device 110) one or more compliance policies, specifications, standards, regulations, etc. with which the customer wishes to comply, and may determine the requirements from the compliance policies, specifications, standards, regulations, etc. specified by the customer.

The requirements may include portions of the specifications, policies, standards, regulations, rules, laws, etc. provided by compliance content 140 and/or 150. For example, if compliance content 140 and/or 150 relates to network security, the requirements may include up-to-date antispyware software, up-to-date antivirus software, a functioning firewall, software backup information, encryption software, etc. Compliance server 120 may match the determined requirements with compliance questions, and may automatically generate a compliance questionnaire 160 based on the compliance questions that match the determined requirements. In one exemplary implementation, if the customer (e.g., associated with user device 110) specifies multiple compliance policies, specifications, standards, regulations, etc. with which the customer wishes to comply, compliance server 120 may generate a single compliance questionnaire 160 (e.g., with the fewest number of compliance questions possible) for the multiple compliance policies, specifications, standards, regulations, etc. specified by the customer.

As further shown in FIG. 1, compliance server 120 may provide compliance questionnaire 160 to user device 110. A user associated with user device 110 may answer questions provided in compliance questionnaire 160, and user device 110 may provide, to compliance server 120, answers 170 to compliance questionnaire 160. In an exemplary implementation, answers 170 to all of the questions in compliance questionnaire 160 may be provided to compliance server 120 at one time.

Alternatively or additionally, answers 170 to each question in compliance questionnaire 160 may be incrementally provided (e.g., on an answer-by-answer basis) to compliance server 120. For example, compliance server 120 may receive an answer to a first question of compliance questionnaire 160, and may determine whether compliance questionnaire 160 needs to be updated based on the answer. In one implementation, if the answer to the question renders moot one or more questions in compliance questionnaire, compliance server 120 may determine that compliance questionnaire 160 needs to be updated. If compliance server 120 determines that compliance questionnaire 160 needs to be updated, compliance server 120 may generate an updated compliance questionnaire 160 based on answers 170, and may provide the updated compliance questionnaire 160 to user device 110. Such an arrangement may enable compliance server 120 to provide a dynamic compliance questionnaire 160 (e.g., a compliance questionnaire that changes based on the answers provided) to user device 110. The dynamic compliance questionnaire 160 may include a minimum set of questions needed to enable an organization (e.g., associated with network 100) or a user (e.g., of user device 110) to determine whether they are compliant (e.g., with specifications, policies, standards, regulations, rules, laws, etc.).

If compliance questionnaire 160 does not need to be updated, compliance server 120 may generate a compliance report 180 based on answers 170, and may provide compliance report 180 to user device 110. Compliance report 180 may include a document with information assessing whether a user (e.g., of user device 110), an organization, or another entity is compliant (e.g., with specifications, policies, standards, regulations, rules, laws, etc.). In one exemplary implementation, compliance report 180 may include one or more comments that are based on particular answers 170, may request one or more file uploads based on particular answers 170, etc. For example, compliance report 180 may provide a compliance score (e.g., indicating a 98% percent compliance with some standard), may identify issues based on answers 170 (e.g., a likelihood of threats, such as data loss due to lack of network security, occurring based on answers 170), may recommend courses of action for compliance purposes (e.g., "please install updated antispyware software in order to be ISO 9001 certified"), etc.

Although FIG. 1 shows exemplary components of network 100, in other implementations, network 100 may contain fewer, different, differently arranged, or additional components than depicted in FIG. 1.

Figure 2:
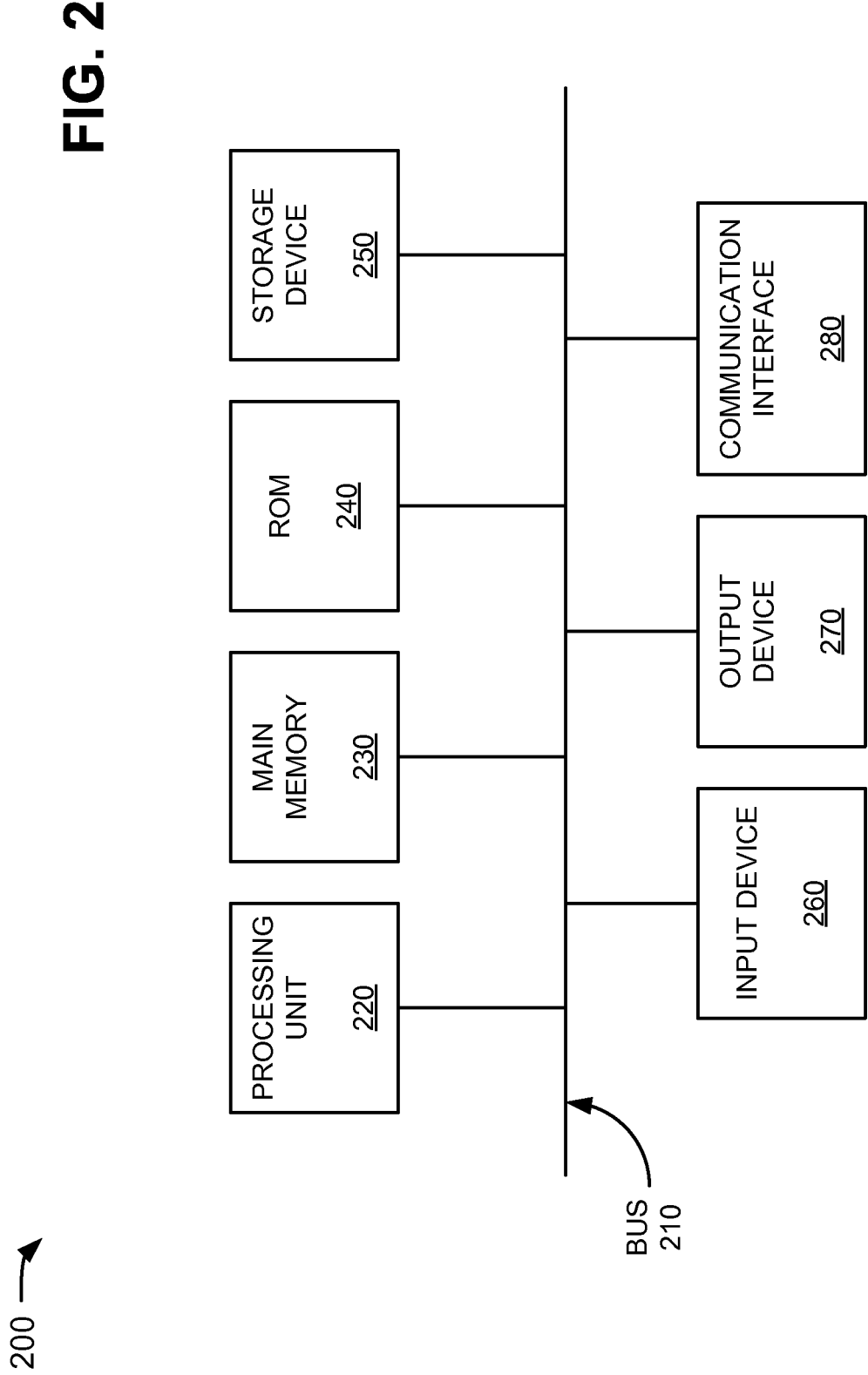
FIG. 2 is a diagram of exemplary components of a user device and/or a compliance server of the network depicted in FIG. 1.

FIG. 2 is an exemplary diagram of a device 200 that may correspond to user device 110 and/or compliance server 120. As illustrated, device 200 may include a bus 210, a processing unit 220, a main memory 230, a read-only memory (ROM) 240, a storage device 250, an input device 260, an output device 270, and/or a communication interface 280. Bus 210 may include a path that permits communication among the components of device 200.

Processing unit 220 may include one or more processors, microprocessors, or other types of processing units that may interpret and execute instructions. Main memory 230 may include one or more random access memories (RAMs) or other types of dynamic storage devices that may store information and instructions for execution by processing unit 220. ROM 240 may include one or more ROM devices or other types of static storage devices that may store static information and/or instructions for use by processing unit 220. Storage device 250 may include a magnetic and/or optical recording medium and its corresponding drive.

Input device 260 may include a mechanism that permits an operator to input information to device 200, such as a keyboard, a mouse, a pen, a microphone, voice recognition and/or biometric mechanisms, a remote control, a touch screen, etc. Output device 270 may include a mechanism that outputs information to the operator, including a display, a printer, a speaker, etc. Communication interface 280 may include any transceiver-like mechanism that enables device 200 to communicate with other devices and/or systems. For example, communication interface 280 may include mechanisms for communicating with another device or system via a network, such as network 130.

As described herein, device 200 may perform certain operations in response to processing unit 220 executing software instructions contained in a computer-readable medium, such as main memory 230. A computer-readable medium may be defined as a physical or logical memory device. A logical memory device may include memory space within a single physical memory device or spread across multiple physical memory devices. The software instructions may be read into main memory 230 from another computer-readable medium, such as storage device 250, or from another device via communication interface 280. The software instructions contained in main memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may contain fewer, different, differently arranged, or additional components than depicted in FIG. 2. Alternatively or additionally, one or more components of device 200 may perform one or more other tasks described as being performed by one or more other components of device 200.

FIGS. 3 and 4 are diagrams of exemplary functional components of compliance server 120. In one implementation, the functions described in connection with FIGS. 3 and 4 may be performed by one or more components of device 200 (FIG. 2). As shown in FIG. 3, compliance server 120 may include a requirement determiner 300, a compliance library 310, a compliance questionnaire generator 320, and a compliance report generator 330.

Requirement determiner 300 may include hardware or a combination of hardware and software that may receive compliance content 140 from user device 110 and/or may receive compliance content 150 from other sources. Requirement determiner 300 may determine one or more requirements 340-1 through 340-M (referred to collectively as "requirements 340," and in some instances, individually as "requirement 340") from compliance content 140 and/or 150. Requirements 340 may include portions of the specifications, policies, standards, regulations, rules, laws, etc. provided by compliance content 140 and/or 150. For example, if compliance content 140 and/or 150 relates to HIPAA, one of requirements 340 may relate to HIPAA's privacy rule, another one of requirements 340 may relate to HIPAA's transactions and code sets rule, still another one of requirements 340 may relate to HIPAA's security rule, etc. Requirement determiner 300 may provide requirements 340 to compliance library 310.

Compliance library 310 may include one or more storage devices that may store a variety of compliance questions (e.g., that may be reused) in a variety of formats (e.g., an extensible markup language (XML) format) and/or languages (e.g., English, Spanish, etc.). For example, compliance library 310 may include compliance questions designed to obtain information associated with specifications, policies, standards, regulations, rules, laws, etc. provided by compliance content 140 and/or 150 or other sources. Compliance library 310 may receive the compliance questions from user device 110 or other sources (e.g., standards bodies), and may update, change, or replace one or more compliance questions.

In an exemplary implementation, compliance library 310 may include hardware or a combination of hardware and software that may receive requirements 340-1 through 340-M from requirement determiner 300, and may match each of requirements 340-1 through 340-M with one or more compliance questions stored in compliance library 310. In one example, compliance library 310 may match requirements 340-1 through 340-M with one or more compliance questions via metric formulas. The metric formulas may determine one or more keywords provided in a particular requirement 340, and may match the one or more keywords with one or more compliance questions that best match the one or more keywords. For example, if a particular requirement 340 includes the keywords "NETWORK SECURITY," the metric formulas may attempt to match the particular requirement 340 with compliance questions related to "NETWORKS" and to "SECURITY." In an exemplary implementation, the metric formulas may utilize methods (e.g., artificial intelligence, heuristics, etc.) that increase the success of matching requirements 340 with one or more compliance questions stored in compliance library 310.

As further shown in FIG. 3, compliance library 310 may determine that compliance questions 350-1 through 350-N (referred to collectively as "compliance questions 350," and in some instances, individually as "compliance question 350") match one or more of requirements 340-1 through 340-M. Compliance library 310 may provide compliance questions 350 to compliance questionnaire generator 320 (e.g., for further processing).

Compliance questionnaire generator 320 may include hardware or a combination of hardware and software that may receive compliance questions 350 from compliance library 310, and may automatically generate compliance questionnaire 160 based on compliance questions 350. Compliance questionnaire generator 320 may provide compliance questionnaire 160 to user device 110. A user associated with user device 110 may answer compliance questions 350 provided in compliance questionnaire 160, and user device 110 may provide answers 170 to compliance questionnaire generator 320. In an exemplary implementation, answers 170 to all of compliance questions 350 in compliance questionnaire 160 may be provided to compliance questionnaire generator 320 at one time.

Alternatively or additionally, answers 170 to each compliance question 350 in compliance questionnaire 160 may be incrementally provided (e.g., on an answer-by-answer basis) to compliance questionnaire generator 320. For example, compliance questionnaire generator 320 may receive a first answer 170 to a first compliance question 350 of compliance questionnaire 160, and may determine whether compliance questionnaire 160 needs to be updated based on the first answer 170. In one implementation, if the first answer 170 to the first compliance question 350 renders moot one or more compliance questions 350 in compliance questionnaire 160, compliance questionnaire generator 320 may determine that compliance questionnaire 160 needs to be updated. If compliance questionnaire generator 320 determines that compliance questionnaire 160 needs to be updated, compliance questionnaire generator 320 may retrieve updated compliance questions 360 from compliance library 310 based on answers 170, and may automatically generate an updated compliance questionnaire 370 based on updated compliance questions 360. Compliance questionnaire generator 320 may provide updated compliance questionnaire 370 to user device 110.

Compliance report generator 330 may include hardware or a combination of hardware and software that may receive answers 170 when compliance questionnaire generator 320 determines that compliance questionnaire 160 does not need to be updated (or updated compliance questionnaire 370 does not need to be updated further). Compliance report generator 330 may generate compliance report 180 based on answers 170, and may provide compliance report 180 to user device 110 and/or to compliance library 310 (e.g., for storage). Although not shown in FIG. 3, answers 170 may also be provided to compliance library 310 for storage.

As shown in FIG. 4, compliance library 310 may include, for example, compliance questions 350-1 through 350-4. It may be assumed, for exemplary purposes, that each of compliance questions 350-1 through 350-4 matches one of requirements 340. For example, as shown in FIG. 4, requirement 340-1 may match compliance question 350-1 (e.g., as determined by compliance library 310). As further shown in FIG. 4, compliance question 350-1 may include a universally unique identifier (UUID) 400-1, question text 410-1, a first potential response 420-1, and a second potential response 430-1. Compliance questions 350-2 through 350-4 may be similarly arranged.

Each of UUIDs 400-1 through 400-4 may include an identifier (e.g., a numeric identifier with an extension (i.e., "2345324234.ISO"), an alphanumeric identifier, an alphabetical identifier, etc.) that may be associated with a particular compliance question. Each of UUIDs 400-1 through 400-4 may be universally unique or globally unique, and may be used to refer to a compliance question regardless of context. Each compliance question 350 may be provided a UUID that may be referenced in a questionnaire template 440 used to generate compliance questionnaire 160 (e.g., by compliance questionnaire generator 320). In one example, answers 170 may be associated with compliance questions 350, via UUIDs, and stored as historical information (e.g., in compliance library 310).

As further shown in FIG. 4, UUID 400-1 (e.g., "2345324234.ISO") may be the same as UUID 400-2 (e.g., "2345324234.PCI") except that UUID 400-1 may have a different extension (e.g., ".ISO") than UUID 400-2 (e.g., ".PCI"). In one example, the extensions may represent a compliance standard. Such similar UUIDs may indicate that compliance questions 350 associated with UUIDs 400-1 and 400-2 are equivalent questions. Equivalent questions may be provided in compliance library 310 because different standards might ask the same question with different wording, or use very specific terms to ask the same question. For example, UUID 400-1 may be associated with a compliance question that asks "Do you have X?" and UUID 400-2 may be associated with a compliance question that asks "Do you own X?" These equivalent questions ask essentially the same thing, but are worded differently. Equivalent questions may be recognized as related (e.g., via the same UUID) but may be distinguished from each other (e.g., via the different extensions).

Question text 410-1 may include text of a compliance question associated with UUID 400-1. For example, as shown in FIG. 4, question text 410-1 may ask the question "Do you have X?" First potential response 420-1 may include a potential response (e.g., "Yes") to question text 410-1 and an indication (e.g., "M1 (met)") of the significance of the response to the compliance standard associated with question text 410-1. Second potential response 430-1 may include another potential response (e.g., "No") to question text 410-1 and an indication (e.g., "M1 (Not met)") of the significance of the response to the compliance standard associated with question text 410-1. In an exemplary implementation, question 350-1 may include more than two potential responses.

As further shown in FIG. 4, compliance questionnaire generator 320 may populate questionnaire template 440 with UUIDs that may be linked to compliance questions provided in compliance library 310. For example, compliance questionnaire generator 320 may provide UUID 400-3 in questionnaire template 440. UUID 400-3 may be linked to compliance question 350-3 via a link 450-1. Compliance question 350-3 may be associated with privacy standards (e.g., "Do you like privacy?"). Compliance questionnaire generator 320 may also provide UUID 400-2 and UUID 400-3 in questionnaire template 440. UUID 400-2 may be linked to compliance question 350-2 via a link 450-2, and UUID 400-3 may be linked to compliance question 350-4 via a link 450-3. Compliance question 350-2 (e.g., "Do you own X?" and compliance question 350-4 (e.g., "Do you have Z?") may also be associated with privacy standards.

After compliance questionnaire generator 320 populates questionnaire template 440 with UUIDs, compliance questionnaire generator 320 may generate compliance questionnaire 160 from questionnaire template 440. In one example, compliance questionnaire generator 320 may use questionnaire template 440 to create a document that includes the compliance questions associated with the UUIDs provided in questionnaire template 440.

In an exemplary implementation, compliance questions 350 may be mapped to various metrics, such that answering a compliance question may set one or more metrics. For example, it may be assumed that the following metrics are provided by compliance server 120:

146.0.0—Vulnerability assessments are conducted against organizational assets 146.1.0—Vulnerability assessments are conducted at least annually 146.2.0—Vulnerability assessment process is documented.

If these metrics are to be validated, compliance server 120 may generate a compliance questionnaire (e.g., compliance questionnaire 160) that includes the following:

Q-2343 Do you perform vulnerability assessments?
Yes—questions with the Ask_Vuln flag should be asked
No—set the following metrics to Not Met 146.0.0, 146.1.0, 146.2.0
This does not apply to me—set the following metrics to Not Applicable 146.0.0, 146.1.0, 146.2.0
Display these questions if the Ask_Vuln flag is set:
Q-2344 Do you perform vulnerability scans at least annually?
Yes—set metric 146.1.0 to Met
No—set metric 146.1.0 to Not Met
Required comment: How frequently do you scan?
Q-2345 Do you have a documented vulnerability assessment process?
Yes—Set metric 146.2.0 to Met
Required file: please upload your vulnerability assessment process document
No—Set metric 146.2.0 to Not Met.

As shown by the above example, compliance server 120 may generate compliance questions 350 that may include flags which may be dynamically changed to determine a question to display; may set a status of zero or more metrics depending upon a provided answer; may require comments or file uploads depending upon a provided answer; etc.

In another exemplary implementation, compliance server 120 may not assume answers to compliance questions 350. For example, if a particular compliance question 350 would disable fifteen (15) other compliance questions 350, compliance server 120 may not assume answers for the fifteen disabled compliance questions 350, but rather may set metrics. As shown in the example above, answering "No" to compliance question "Q-2343" may cause compliance server 120 to set a number of metrics (e.g., to set metrics 146.0.0, 146.1.0, and 146.2.0 to "Not Met"). Thus, compliance questions 350 may be adaptive since the disabled compliance questions may not be presented in compliance questionnaire 160.

In still another exemplary implementation, compliance server 120 may generate compliance questionnaire 160 by first assuming that all of the compliance questions provided in compliance library 310 are available for compliance questionnaire 160. As compliance server 120 obtains more information (e.g., via compliance content 140/150, answers 170, etc.), compliance server 120 may disable one or more compliance questions from compliance questionnaire 160. This may enable compliance server 120 to pick and choose compliance questions from compliance library 310 and to decide (e.g., based on the chosen compliance questions) how to disable the chosen compliance questions with gating (e.g., conditional) compliance questions. For example, if compliance server 120 selects two-hundred compliance questions from compliance library 310, compliance server 120 may determine that there are fifty facts that may be used to disable some number of compliance questions (e.g., "Fact1 may disable 55 questions," "Fact2 may disable 10 questions," "Fact3 may disable 7 questions," etc.). Based on this information, compliance server 120 may determine what gating compliance questions may be used to achieve an optimal compliance questionnaire 160 (e.g., a questionnaire that includes a minimum set of questions needed to determine whether an entity is compliant with specifications, policies, standards, regulations, rules, laws, etc.).

Although FIGS. 3 and 4 show exemplary functional components of compliance server 120, in other implementations, compliance server 120 may contain fewer, different, differently arranged, or additional functional components than depicted in FIGS. 3 and 4. Alternatively or additionally, one or more functional components of compliance server 120 may perform one or more other tasks described as being performed by one or more other functional components of compliance server 120.

FIGS. 5A-8 are flow charts of an exemplary process 500 for automatically generating compliance questionnaires according to implementations described herein. In one implementation, process 500 may be performed by compliance server 120. In another implementation, some or all of process 500 may be performed by another device or group of devices, including or excluding compliance server 120.

As illustrated in FIG. 5A, process 500 may include receiving, from a user device, compliance content for a compliance report (block 505), determining requirements of the compliance content (block 510), and matching the requirements with compliance questions provided in a compliance library (block 515). For example, in implementations described above in connection with FIG. 1, user device 110 may provide compliance content 140 to compliance server 120, and/or compliance server 120 may receive compliance content 150 from other sources (e.g., other user devices, the Internet, standards organizations, etc.). Compliance content 140/150 may include content associated with specifications, policies, standards, regulations, rules, laws, etc. to be complied with (e.g., by an organization associated with network 100). Compliance server 120 may determine requirements from compliance content 140 and/or 150. The requirements may include portions of the specifications, policies, standards, regulations, rules, laws, etc. provided by compliance content 140 and/or 150. In one example, if compliance content 140 and/or 150 relates to network security, the requirements may include up-to-date antispyware software, up-to-date antivirus software, a functioning firewall, software backup information, encryption software, etc. Compliance server 120 may match the determined requirements with compliance questions.

As further shown in FIG. 5A, a compliance questionnaire may be automatically generated based on the compliance questions matching the requirements (block 520), the compliance questionnaire may be provided to the user device (block 525), and answers to the compliance questionnaire may be received from the user device (block 530). For example, in implementations described above in connection with FIG. 1, compliance server 120 may automatically generate compliance questionnaire 160 based on the compliance questions that match the determined requirements. Compliance server 120 may provide compliance questionnaire 160 to user device 110. A user associated with user device 110 may answer questions provided in compliance questionnaire 160, and user device 110 may provide, to compliance server 120, answers 170 to compliance questionnaire 160. In one example, answers 170 to all of the questions in compliance questionnaire 160 may be provided to compliance server 120 at one time. Alternatively or additionally, answers 170 to each question in compliance questionnaire 160 may be incrementally provided (e.g., on an answer-by-answer basis) to compliance server 120.

Figure 5B:
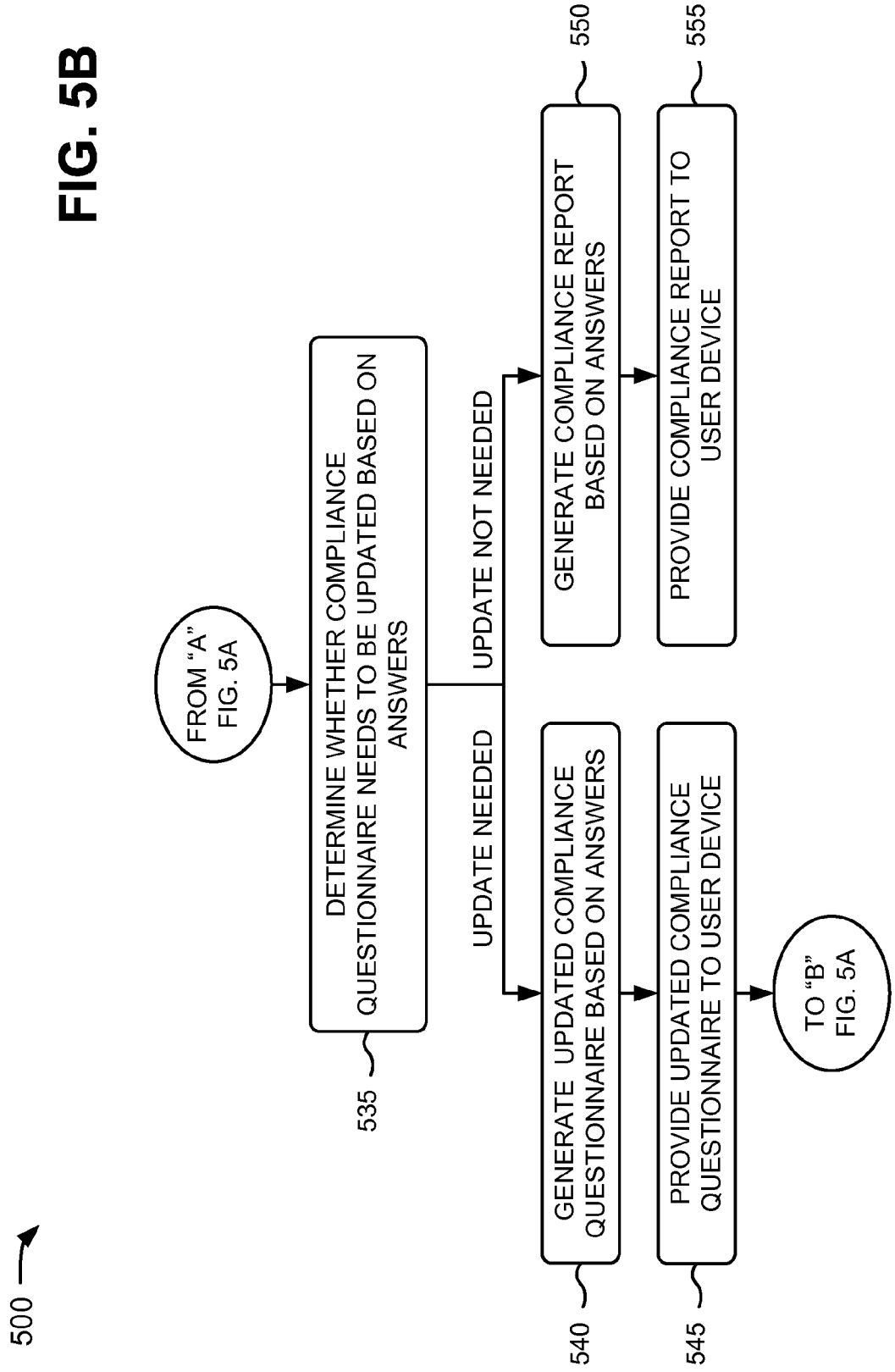

As shown in FIG. 5B, process 500 may include determining whether the compliance questionnaire needs to be updated based on the answers (block 535). If the compliance questionnaire needs to be updated (block 535—"UPDATE NEEDED"), an updated compliance questionnaire may be generated based on the answers (block 540), the updated compliance questionnaire may be provided to the user device (block 545), and process 500 may return to process block 530 (FIG. 5A). For example, in implementations described above in connection with FIG. 1, compliance server 120 may receive an answer to a first question of compliance questionnaire 160, and may determine whether compliance questionnaire 160 needs to be updated based on the answer. In one example, if the answer to the question renders moot one or more questions in compliance questionnaire, compliance server 120 may determine that compliance questionnaire 160 needs to be updated. If compliance server 120 determines that compliance questionnaire 160 needs to be updated, compliance server 120 may generate an updated compliance questionnaire 160 based on answers 170, and may provide the updated compliance questionnaire 160 to user device 110.

As further shown in FIG. 5B, if the compliance questionnaire does not need to be updated (block 535—"UPDATE NOT NEEDED"), a compliance report may be generated based on the answers (block 550) and the compliance report may be provided to the user device (block 555). For example, in implementations described above in connection with FIG. 1, if compliance questionnaire 160 does not need to be updated, compliance server 120 may generate compliance report 180 based on answers 170, and may provide compliance report 180 to user device 110. Compliance report 180 may include a document with information assessing whether a user, an organization, or another entity is compliant (e.g., with specifications, policies, standards, regulations, rules, laws, etc.). In one example, compliance report 180 may provide a compliance score (e.g., indicating a 98% percent compliance with some standard), may identify issues based on answers 170 (e.g., a likelihood of threats, such as data loss due to lack of network security, occurring based on answers 170), may recommend courses of action for compliance purposes (e.g., "please install updated antispyware software in order to be ISO 9001 certified"), etc.

Process block 515 may include the process blocks depicted in FIG. 6. As shown in FIG. 6, process block 515 may include one of providing compliance questions with flags that dynamically change to determine content of the compliance questions (block 600), providing compliance questions that require comments and/or file uploads dependent upon provided answers (block 610), or providing compliance questions that include unique identifiers (block 620), and matching the requirements with the provided compliance questions (block 630). For example, in implementations described above in connection with FIGS. 3 and 4, compliance server 120 may generate compliance questions 350 that may include flags which may be dynamically changed to determine a question to display; may set a status of zero or more metrics depending upon a provided answer; may require comments or file uploads depending upon a provided answer; etc. Each compliance question 350 may be provided a UUID that may be referenced in questionnaire template 440 used to generate compliance questionnaire 160 (e.g., by compliance questionnaire generator 320). Compliance server 120 may match the determined requirements with compliance questions.

Process block 520 may include the process blocks depicted in FIG. 7. As shown in FIG. 7, process block 520 may include associating, in the compliance library, unique identifiers with compliance questions (block 700), populating a compliance template with unique identifiers associated with the compliance questions matching the requirements (block 710), and linking the unique identifiers provided in the compliance template with corresponding compliance questions, provided in the compliance library, to create the compliance questionnaire (block 720). For example, in implementations described above in connection with FIG. 4, each of UUIDs 400-1 through 400-4 may include an identifier (e.g., a numeric identifier with an extension (i.e., "2345324234.ISO"), an alphanumeric identifier, an alphabetical identifier, etc.) that may be associated with a particular compliance question. Compliance questionnaire generator 320 may populate questionnaire template 440 with UUIDs that may be linked to compliance questions provided in compliance library 310. In one example, compliance questionnaire generator 320 may provide UUID 400-3 in questionnaire template 440. UUID 400-3 may be linked to compliance question 350-3 via a link 450-1. After compliance questionnaire generator 320 populates questionnaire template 440 with UUIDs, compliance questionnaire generator 320 may generate compliance questionnaire 160 from questionnaire template 440.

Process block 555 may include the process blocks depicted in FIG. 8. As shown in FIG. 8, process block 555 may include providing one or more comments in the compliance report based on one or more particular answers received from the user device (block 800) or requesting one or more file uploads, via the compliance report, based on one or more particular answers received from the user device (block 810). For example, in implementations described above in connection with FIG. 1, compliance report 180 may include one or more comments that are based on particular answers 170, may request one or more file uploads based on particular answers 170, etc. For example, compliance report 180 may provide a compliance score (e.g., indicating a 98% percent compliance with some standard), may identify issues based on answers 170 (e.g., a likelihood of threats, such as data loss due to lack of network security, occurring based on answers 170), may recommend courses of action for compliance purposes (e.g., "please install updated antispyware software in order to be ISO 9001 certified"), etc.

Implementations described herein may provide systems and/or methods that may automatically generate compliance questionnaires based on compliance content received from a user device and/or other sources.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 5A-8, the order of the blocks may be modified in other implementations. Further, non-dependent blocks may be performed in parallel.

It will be apparent that exemplary aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, block, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:
1. A computing device-implemented method comprising:
storing, by the computing device, a plurality of compliance questions,
the plurality of compliance questions being associated, respectively, with a plurality of unique identifiers,
each unique identifier of the plurality of unique identifiers including:
a character string, and
an extension,
two compliance questions, of the plurality of compliance questions, being associated, respectively, with two unique identifiers, of the plurality of unique identifiers, that include a same character string when the two compliance questions are directed to corresponding content, and
the extension for a unique identifier, of the plurality of unique identifiers, identifying a corresponding compliance standard, of a plurality of compliance standards, associated with a respective compliance question of the plurality of compliance questions;
receiving, by the computing device, compliance content associated with a particular compliance standard of the plurality of compliance standards;
determining, by the computing device, one or more requirements associated with the particular compliance standard;
identifying, by the computing device and based on the particular compliance standard and the one or more requirements, one or more compliance questions of the plurality of compliance questions, identifying the one or more compliance questions including:
    identifying one or more keywords associated with the one or more requirements,
    selecting, based on the one or more keywords, compliance questions from the plurality of compliance questions,
    identifying the one or more compliance questions from the selected compliance questions based on the particular compliance standard,
        the unique identifier for each of the one or more compliance questions including a particular extension associated with the particular compliance standard;
generating, by the computing device, a compliance questionnaire based on the one or more compliance questions;
providing, by the computing device, the compliance questionnaire to a user device;
receiving, by the computing device and from the user device, answers to the compliance questionnaire;
generating, by the computing device, a compliance report based on the answers received from the user device, the compliance report including information identifying:
    a score associated with whether the answers indicate compliance with the particular compliance standard, and
    one or more suggestions for improving the score; and
providing, by the computing device, the compliance report to the user device.

2. The computing device-implemented method of claim 1, where generating the compliance report further includes:
    generating, based on at least one of the answers, one or more comments regarding compliance with the particular compliance standard; and
    including, in the compliance report, the one or more comments.

3. The computing device-implemented method of claim 1, where generating the compliance report further includes:
    identifying, based on at least one of the answers, additional information related to compliance with the particular compliance standard;
    identifying one or more files associated with the additional information; and
    including, in the compliance report, a request for the one or more files.

4. The computing device-implemented method of claim 1, further comprising:
    determining, based on the answers, to update the compliance questionnaire;
    generating, based on determining to update the compliance questionnaire, an updated compliance questionnaire using the answers; and
    providing the updated compliance questionnaire to the user device.

5. The computing device-implemented method of claim 4, where generating the compliance report further includes:
    receiving, from the user device, additional answers associated with the updated compliance questionnaire; and
    generating the compliance report further based on the additional answers.

6. The computing device-implemented method of claim 1, where storing the plurality of compliance questions further includes at least one of:
    storing first questions associated with flags that dynamically change to determine content of the compliance questions;
    storing second questions associated with generating comments; or
    storing third questions associated with file uploads, and
    where identifying the one or more compliance questions further comprises:
        selecting, based on the one or more requirements, the one or more compliance questions from at least one of the first questions, the second questions, or the third questions.

7. The computing device-implemented method of claim 1, where generating the compliance questionnaire further includes:
    particular compliance standard, one or more unique identifiers of the plurality of unique identifiers; and
    linking, based on the one or more unique identifiers provided in the compliance template, the one or more compliance questions to the compliance questionnaire.

8. A device, comprising:
a memory to store compliance questions,
    the plurality of compliance questions being associated, respectively, with a plurality of unique identifiers,
        each unique identifier of the plurality of unique identifiers including:
            a character string, and
            an extension,
                two compliance questions, of the plurality of compliance questions, being associated, respectively, with two unique identifiers, of the plurality of unique identifiers, that include a same character string when the two compliance questions are directed to corresponding content, and
                the extension for a unique identifier, of the plurality of unique identifiers, identifying a corresponding compliance standard, of a plurality of compliance standards, associated with a respective compliance question of the plurality of compliance questions; and
a processor to:
    receive a request for a compliance questionnaire associated with compliance content,
    determine, based on the compliance content, a plurality of requirement candidates and a particular compliance standard of the plurality of compliance standards,
    identify, based on the plurality of requirement candidates and the particular compliance standard, two or more compliance questions of the compliance questions,
        the processor, when identifying the two or more compliance questions, being further to:
            identify, based on the plurality of requirement candidates and the particular compliance standard, first compliance questions, from the plurality of compliance questions,
            identify, based on the compliance content and the particular compliance standard, respective sets of keywords associated with the plurality of requirement candidates,
            select, based on the respective sets of keywords and the particular compliance standard, respective sets of second compliance questions, from the plurality of compliance questions, for the plurality of requirement candidates, and include the first compliance questions and the respective sets of second compliance questions in the two or more compliance questions,
the unique identifier for each of the two or more compliance questions including a particular extension associated with the particular compliance standard,
generate the compliance questionnaire based on the two or more compliance questions, and
provide the compliance questionnaire to a user device, the compliance questionnaire causing the user device to:
present the first compliance questions,
identify, based on answers to the first compliance questions, one or more requirements from the plurality of requirement candidates, and
present a particular set, of the sets of second compliance questions, associated with the one or more requirements, without presenting other sets of the sets of second compliance questions.

9. The device of claim 8, where the processor is further to:
receive, from the user device, answers to the compliance questionnaire,
generate, based on the answers received from the user device, a compliance report associated with whether compliance with the particular compliance standard is achieved, and
provide the compliance report to the user device.

10. The device of claim 9, where the processor, when generating the compliance report, is further to:
include, in the compliance report, one or more of:
a generated comment based on one or more answers of the answers received from the user device, or
a request for a file upload based on at least one answer of the answers received from the user device.

11. The device of claim 8, where the processor is further to:
receive, from the user device, answers to the compliance questionnaire,
determine, based on the answers received from the user device, to update the compliance questionnaire,
generate, based on determining to update the compliance questionnaire, an updated compliance questionnaire based on the answers, and
provide the updated compliance questionnaire to the user device.

12. The device of claim 11, where the processor is further to:
receive, from the user device, additional answers to the updated compliance questionnaire,
generate a compliance report using the answers received from the user device and additional answers received from the user device to the updated compliance questionnaire, and
provide the compliance report to the user device.

13. The device of claim 8, where the memory, when storing the compliance questions, is further to:
store at least one of:
first questions associated with flags that dynamically change to determine content of the compliance questions,
second questions associated with generating comments, or
third questions associated with file uploads,
and
where the processor, when identifying the two or more compliance questions is further to:
identify, based on the plurality of requirement candidates, the two or more compliance questions from at least one of the first questions, the second questions, or the third questions.

14. The device of claim 8, where, when generating the compliance questionnaire, the processor is further to:
provide, in a compliance template, two or more unique identifiers, of the plurality unique identifiers, associated with the two or more compliance questions; and
link, based on the two or more of the unique identifiers provided in the compliance template, the two or more compliance questions to the compliance questionnaire.

15. A non-transitory computer-readable memory device to store instructions, the instructions comprising:
one or more instructions that, when executed by a processor, cause the processor to store a plurality of compliance questions,
the plurality of compliance questions being associated, respectively, with a plurality of unique identifiers,
each unique identifier of the plurality of unique identifiers including:
a character string, and
an extension,
two compliance questions, of the plurality of compliance questions, being associated, respectively, with two unique identifiers, of the plurality of unique identifiers, that include a same character string when the two compliance questions are directed to corresponding content, and
the extension for a unique identifier, of the plurality of unique identifiers, identifying a corresponding compliance standard, of a plurality of compliance standards, associated with a respective compliance question of the plurality of compliance questions;
one or more instructions that, when executed by the processor, cause the processor to receive compliance content associated with a particular compliance standard of the plurality of compliance standards;
one or more instructions that, when executed by the processor, cause the processor to determine one or more requirements associated with the particular compliance standard;
one or more instructions that, when executed by the processor, cause the processor to identify, based on the one or more requirements, one or more compliance questions of the plurality of compliance questions,
the one or more instructions to identify the one or more compliance questions including:
one or more instructions to identify keywords associated with the one or more requirements,
one or more instructions to select compliance questions, from the plurality of compliance questions, that correspond to one or more of the keywords, and
one or more instructions to identify the one or more compliance questions, from the selected compliance questions, based on the particular compliance standard,
the unique identifier, for each of the one or more compliance questions, including a particular extension associated with the particular compliance standard;
one or more instructions that, when executed by the processor, cause the processor to automatically generate a compliance questionnaire based on the one or more compliance questions;

one or more instructions that, when executed by the processor, cause the processor to provide the compliance questionnaire to a user device;

one or more instructions that, when executed by the processor, cause the processor to receive, from the user device, answers to the compliance questionnaire;

one or more instructions that, when executed by the processor, cause the processor to generate a compliance report based on the answers received from the user device; and one or more instructions that, when executed by the processor, cause the processor to provide the compliance report to the user device.

16. The non-transitory computer-readable memory device of claim 15, where the instructions further comprise:

one or more instructions to determine whether to update the compliance questionnaire based on the answers received from the user device;

one or more instructions to generate, based on the answers, an updated compliance questionnaire when the compliance questionnaire is to be updated;

one or more instructions to provide the updated compliance questionnaire to the user device; and one or more instructions to receive, from the user device, additional answers to the updated compliance questionnaire, where the compliance report is further based on the additional answers.

17. The non-transitory computer-readable memory device of claim 15, where the one or more instructions to generate the compliance questionnaire include:

one or more instructions to provide, in a compliance template, one or more of the unique identifiers associated with the one or more compliance questions; and one or more instructions to link, based on the one or more of the unique identifiers provided in the compliance template, the one or more compliance questions to the compliance questionnaire.

18. The non-transitory computer-readable memory device of claim 15, where the one or more instructions to generate the compliance report include:

one or more instructions to generate, based on at least one of the answers, one or more comments regarding compliance with the one or more requirements and the particular compliance standard; and one or more instructions to include, in the compliance report, the one or more comments.

19. The non-transitory computer-readable memory device of claim 15, where the one or more instructions to generate the compliance report further include:

one or more instructions to identify, based on at least one of the answers, additional information related to compliance with the one or more requirements and the particular compliance standard;

one or more instructions to identify one or more files associated with the additional information; and one or more instructions to include, in the compliance report, a request for the one or more files.

20. The non-transitory computer-readable memory device of claim 15, where the one or more instructions to select the one or more compliance questions, from the plurality of compliance questions, that correspond to the one or more of the keywords include:

one or more instructions select the one or more compliance questions from the plurality of compliance questions further based on one or more metric formulas.

\* \* \* \* \*